United States Patent
Weber

(10) Patent No.: US 10,345,561 B2
(45) Date of Patent: Jul. 9, 2019

(54) LASER BEAM DUMP

(71) Applicant: BAE SYSTEMS INFORMATION AND ELECTRONIC SYSTEMS INTEGRATION INC., Nashua, NH (US)

(72) Inventor: Jonathan L. Weber, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 51 days.

(21) Appl. No.: 15/379,670

(22) Filed: Dec. 15, 2016

(65) Prior Publication Data

US 2018/0172965 A1 Jun. 21, 2018

(51) Int. Cl.
*G02B 5/00* (2006.01)
*G02B 17/00* (2006.01)

(52) U.S. Cl.
CPC .......... *G02B 17/004* (2013.01); *G02B 5/003* (2013.01)

(58) Field of Classification Search
CPC .............................. G02B 17/004; H01S 3/05
USPC ....................................................... 359/614
See application file for complete search history.

(56) References Cited

U.S. PATENT DOCUMENTS

| 3,648,056 A * | 3/1972 | Buttweiler ................ G01J 1/06 250/228 |
| 4,864,098 A * | 9/1989 | Basanese ................ H01S 3/005 219/121.61 |
| 2003/0210465 A1 * | 11/2003 | Valenti ................... G02B 5/003 359/614 |

OTHER PUBLICATIONS

Asmail, Clara. "Bidirectional scattering distribution function (BSDF): a systematized bibliography." J. of Research of the National Institute of Standards and Technology 96.2 (1991): 512-223.
Zazula, J. M., and S. Péraire. LHC Beam Dump Design Study. CERN LHC Project Report 80, 1996.

* cited by examiner

*Primary Examiner* — Evan P Dzierzynski
*Assistant Examiner* — Mitchell T Oestreich
(74) *Attorney, Agent, or Firm* — Sand, Sebolt & Wernow LPA; Scott J. Asmus

(57) ABSTRACT

A laser beam dump is provided. The laser beam dump may include a housing that has a plurality of connected walls defining an atypical or asymmetrical polygonal prism. When viewed in longitudinal cross-section, the asymmetrical polygonal prism housing defines a general hexagon shape. A chamber is defined by the housing and a highly reflective cone is positioned therein. The inner surfaces of the housing are formed from a highly absorptive material with respect to electromagnetic energy in the form of a laser beam. When an laser beam enters the chamber of the beam dump, it contacts the highly reflective cone outer surface and it nearly fully reflected to the absorptive walls of the housing. This reduces the reflection scatter of light from the first contact with the cone.

18 Claims, 3 Drawing Sheets

LASER BEAM DUMP

TECHNICAL FIELD

The present disclosure relates to lasers systems. More particularly, the present disclosure relates to laser beam dumps.

BACKGROUND INFORMATION

Laser beam dumps are useful for receiving a high powered laser beams. Conventional teachings for laser beam dumps provide a means for receiving and dissipating energy from the laser beam. Some exemplary conventional beam dumps are cylindrical (i.e., rectangular in longitudinal cross section; the rear wall is perpendicular to the cylindrical sidewall) and have a cone positioned within a chamber. Typically, the cone is formed from a light absorbing material. Further, the cone's surface is angled relative to the incoming laser beam to reflect an energy which was not absorbed by the light absorbing cone. The inner surface of the cylinder, or the cylindrical sidewalls themselves, are also usually fabricated from a light absorbing material. Thus, any light not-absorbed by the cone, should be absorbed by the light absorbing sidewalls.

SUMMARY

Issues continue to exist with conventional laser beam dumps inasmuch as they have the tendency to enable bidirectional reflection scatter at the first incidence with the cone formed from light-absorbing material which reduces the number of reflections bouncing between outer surface of the cone and the inner surface of the cylinder. Typically, the reflection scatter is fairly large, typically 0.1/sr (steradian) or more. Thus, a need exists to provide a laser beam dump that reduces the reflection scatter. The present disclosure addresses these and other issues.

In one aspect, an embodiment of the present disclosure may provide a laser beam dump. The laser beam dump may include a housing that has a plurality of connected walls defining an atypical or asymmetrical polygonal prism. When viewed in longitudinal cross-section, the asymmetrical polygonal prism housing defines a general hexagon shape (i.e., six sides, but the angles formed therein are not necessarily equal). A chamber is defined by the housing and a highly reflective cone is positioned therein. The inner surfaces of the housing are formed from a highly absorptive material with respect to electromagnetic energy in the form of a laser beam. When an laser beam enters the chamber of the beam dump, it contacts the highly reflective cone outer surface and it nearly fully reflected to the absorptive walls of the housing. This reduces the reflection scatter of light from the first contact with the cone.

In another aspect, an exemplary embodiment of the present disclosure may provide a laser beam dump that reduces reflection scatter and includes: a housing defining a chamber, wherein the housing defines an entrance opening to the chamber; a rear wall of the housing opposite the entrance opening; a first sidewall of the housing extending towards the entrance opening from a non-orthogonal connection with the rear wall; and a conical surface positioned in the chamber adapted to deflect a laser beam passing through the entrance opening. A further embodiment may provide, a cone member including a apex and a base, wherein the apex is nearer the entrance opening and the base is nearer the rear wall; and an interior angle of the apex in cross section in an range from 5° to 25°. A further embodiment may provide, wherein the range is from 10° to 20°. A further embodiment may provide, wherein the range is from 15° to 18°. A further embodiment may provide, a first dimension associated with a diameter of the base of the cone member in cross section; a second dimension associated with a height of the rear wall in cross section; wherein the second dimension is greater than the first dimension. A further embodiment may provide, a ratio of the second dimension to the first dimension of at least 2:1, and wherein a portion of the rear wall is exposed to the chamber. A further embodiment may provide, a ratio of the second dimension to the first dimension of about 3:1, and wherein a portion of the rear wall is exposed to the chamber. A further embodiment may provide, an obtuse angle defined between the rear wall and the first sidewall in cross section. A further embodiment may provide, a second sidewall of the housing connected non-orthogonally to a forward end of the first sidewall. A further embodiment may provide, an obtuse angle defined between the first sidewall and the second sidewall in cross section. A further embodiment may provide, a forward wall of the housing, wherein the forward wall defines the entrance opening; the forward wall connected non-orthogonally to a forward end of the second sidewall. A further embodiment may provide, an obtuse angle defined between the second sidewall and the forward wall in cross section. A further embodiment may provide, wherein the angle defined between the rear wall and the first sidewall is in a range from 100° to 120°. A further embodiment may provide, wherein the angle defined between the first sidewall and the second sidewall is in a range from 120° to 140°. A further embodiment may provide, wherein the angle defined between the second sidewall and the forward wall is in a range from 110° to 130°. A further embodiment may provide, wherein the angle defined between the rear wall and the first sidewall is 110°; wherein the angle defined between the first sidewall and the second sidewall is 130°; and wherein the angle defined between the second sidewall and the forward wall is 120°. A further embodiment may provide, wherein portions of the forward wall, the second sidewall, the first sidewall, and the rear wall that are exposed to the chamber are formed from a light absorbing material that absorbs at least 97% of contacting light. A further embodiment may provide, a ratio of first sidewall length to second sidewall length in a range from 1:1 to 3:1. A further embodiment may provide, wherein the ratio of first sidewall length to second sidewall length is 3:2.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
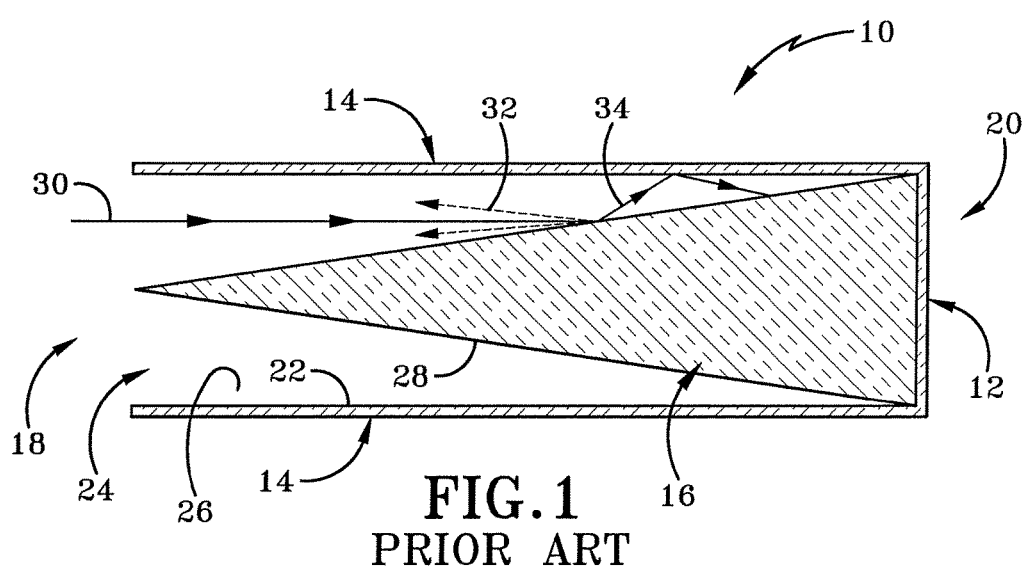
FIG. 1 is an operational schematic cross section view of a conventional laser beam dump having a generally cylindrical configuration with a cone member disposed therein.

FIG. 1 depicts a conventional laser beam dump generally at 10. Conventional beam dump 10 includes a rear wall 12, a cylindrical sidewall 14, and a cone or a cone member 16. The conventional beam dump 10 further includes a forward end 18 opposite a rear end 20 defining a longitudinal direction therebetween.

Inasmuch as the conventional beam dump 10 is generally cylindrical but depicted in longitudinal cross section in FIG. 1, the cylindrical sidewall 14 appears as two planar walls spaced parallel opposite each other. However, it is to be entirely understood that these walls form a continuous cylindrical sidewall. Similarly, the cone member 16 appears as generally triangular in shape in FIG. 1 however, the cone member 16 has a continuous outer surface as one having ordinary skill in the art would understand.

The rear wall 12 is generally circular when viewed from an end defining the rear end 20. The rear wall 12 includes a rearwardly facing outer surface opposite a forwardly facing inner surface. The cylindrical sidewall 14 is rigidly connected to the radially outermost edge of the rear wall 12 and defines an interior 90° angle therebetween. The cylindrical sidewall 14 includes an outwardly facing outer surface opposite an inwardly facing inner surface 22. The cylindrical inner surface 22 is continuous extending from the rear wall 12 to a forward terminal end of cylindrical sidewall 14. An entrance opening 24 is defined adjacent the forward terminal end of cylindrical sidewall 14. The entrance opening 24 is in open fluid communication with a chamber 26 which is defined by the continuous cylindrical inner surface 22.

The cone member 16 is disposed within chamber 26. Some configurations may provide the cone member 16 attached to rear wall 12 such that the base of cone member 16 has the same diameter of the inner surface of rear wall 12. As such, the base corners of the cone member 16 fit in the location of the 90° angle defined between the cylindrical sidewall 14 and the rear wall 12. The cone member 16 includes a continuous outer surface 28 extending from the base of the cone member 16 towards the cone apex.

The conventional beam dump 10 is constructed to utilize multiple reflections off high absorption materials in order to reduce the return or reflection of light entering the chamber 26. Conventional beam dump 10 is designed to make the number of reflections large. In accordance with this design, the inner surface 22 of cylindrical sidewall 14 and the outer surface 28 of cone 16 are constructed from highly absorbent material. Some exemplary configurations provide the inner surface 22 and the outer surface 28 to be formed from anodized aluminum which is known to absorb at least ninety-seven percent of the light contacting the same.

However, the conventional laser beam dump 10 is not without faults. Specifically, when laser beam 30 enters the chamber 26 through entrance opening 24, a bidirectional reflection scatter 32 occurs. This bidirectional reflection scatter 32 occurs at the first incidence which reduces the number of reflections 34 bouncing between outer surface 28 and inner surface 22. Typically, the scatter 32 is fairly large, typically 0.1/sr or more.

Figure 2:
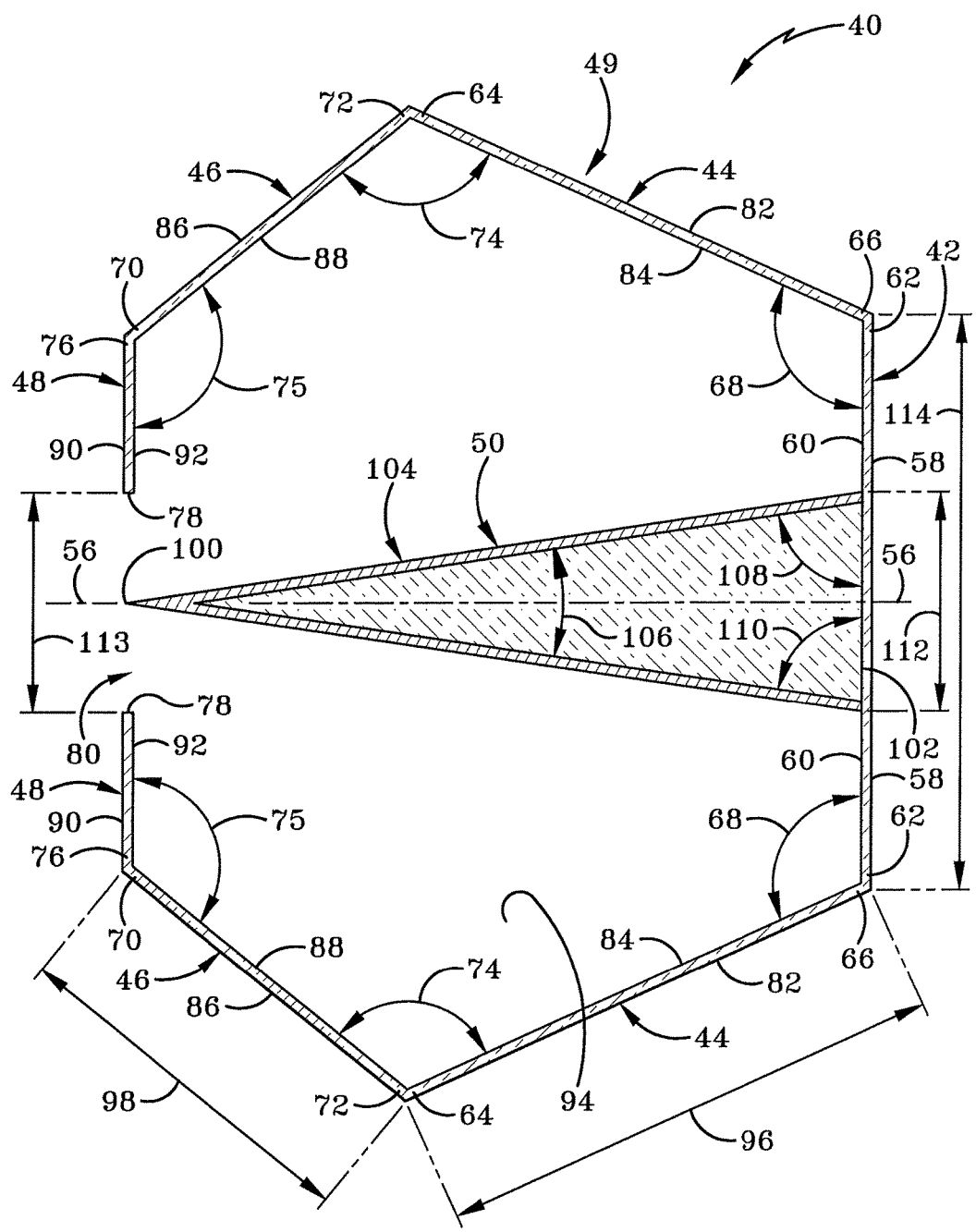
FIG. 2 is a cross section view of a laser beam dump in accordance with the present disclosure.

FIG. 2 depicts a cross sectional view of a laser beam dump in accordance with the present disclosure generally at 40. Laser beam dump 40 has a housing 49 which includes a rear wall 42, a first sidewall 44, a second sidewall 46, a forward wall 48. The laser beam dump 40 also includes a cone or cone member 50 positioned within the housing 49. Laser beam dump 40 includes a forward end 52 opposite a rear end 54 defining a longitudinal direction therebetween. Laser beam dump 40 is centered about a longitudinal axis 56.

It is to be understood that FIG. 2 depicts the laser beam dump 40 of the present disclosure in cross section. The longitudinal cross sectional view is symmetric relative to longitudinal axis 56. As such, components of the laser beam dump 40 described below utilize similar reference numerals for components thereof positioned above the longitudinal axis 56 and below the longitudinal axis 56. Those having ordinary skill in the art would understand that the three-dimensional configuration of laser beam dump 40 would have a volume similar to a polygonal prism with some portions of the polygonal prism having different lengths of sidewalls such that it is not considered a normal polygonal prism. Rather, laser beam dump 40 is configured as an atypical polygonal prism because the interior angles are not all equal. Stated otherwise, some interior angles defined between connecting walls defining the housing of laser beam dump 40 are different. In some implementations, the interior angles may be similar or, in other implementations, all interior angles may be different. However, in cross section (FIG. 2), the housing 49 generally appears similar to an atypical hexagon having six sides, but with some sides having different lengths and different angles formed therein between adjoining walls.

The rear wall 42 defines the rear end 54 and includes an outer surface 58 opposite an inner surface 60. The rear wall 42 includes a radial outermost end 62 relative to the longitudinal axis 56.

The first sidewall 44 includes a forward end 64 and a rear end 66. The rear end 66 of first sidewall 44 is rigidly connected adjacent the radial outermost end 62 of rear wall 42. The connection of rear wall 42 to first sidewall 44 defines an interior angle 68 therebetween. Angle 68 between rear wall 42 and first sidewall 44 is non-orthogonal. In one particular embodiment, the angle 68 is an obtuse angle. In another particular embodiment, the angle 68 between rear wall 42 and first sidewall 44 is in a range from about 100° to about 120°. In one particular embodiment, angle 68 is about 110°.

The second sidewall 46 includes a forward end 70 and a rear end 72. The rear end 72 of second sidewall 46 is rigidly connected adjacent the forward end 64 of first sidewall 44. An angle 74 is defined between the connection of the first sidewall 44 with the second sidewall 46. In one particular embodiment, the angle 74 defined between the first sidewall 44 and the second sidewall 46 is an obtuse angle such that first sidewall 44 is non-orthogonal relative to second sidewall 46. In another particular embodiment, the angle 74 between first sidewall 44 and second sidewall 46 is in a range from about 120° to about 140°. In another particular embodiment, the angle 74 between the first sidewall 44 and the second sidewall 46 is about 130°.

The forward wall 48 includes a radial outermost end 76 relative to longitudinal axis 56. Forward wall 48 further includes an inner terminal end 78 spaced apart from the longitudinal axis 56. An entrance opening 80 is defined by the inner terminal end of the forward wall 48. An angle 75 is defined between second sidewall 46 and forward wall 48 by the connection of the radial outermost end 76 of forward wall 48 with the forward end 70 of second sidewall 46. The second sidewall 46 is oriented non-orthogonally relative to forward wall 48. In one particular embodiment, angle 75 is an obtuse angle in a range from about 110° to about 130°. In another particular embodiment, angle 75 defined between second sidewall 46 and forward sidewall 48 is about 120°.

In one particular embodiment, when viewing the angles (angle 75, angle 74, and angle 68) in cross section, they are arranged longitudinally from the entrance opening 80 towards the rear wall 42 in the following manner: angle 75 formed between the forward wall 48 and the second sidewall 46 is the second largest of the three angles; angle 74 formed between the second sidewall 46 and the first sidewall 44 is the largest of the three angles; and angle 68 formed between the rear wall 42 and the first sidewall 44 is the smallest of the three angles wherein each of the three angles is obtuse. In some embodiments, the three angles may be equal to one another. In other embodiments, all three angles may be different from one another. And in other embodiments, two angles may equal each other with a third angle being different.

First sidewall 44 includes an outer surface 82 and an inner surface 84. The second sidewall 46 includes an outer surface 86 and an inner surface 88. The forward wall 48 includes an outer surface 90 and an inner surface 92. Collectively, the inner surfaces 60, 84, 88, and 92 define an interior chamber 94 bound by the walls and in open communication with entrance opening 80.

The inner surfaces of the housing 49 defined by rear wall 42, first sidewall 44, second sidewall 46, and forward wall 48 are formed from a material that is highly absorbing of energized light. One exemplary non-limiting material which may form the inner surfaces 60, 84, 88, and 92 is anodized aluminum which is known to absorb at least ninety-seven percent of the light on each bounce of a reflected beam. Alternatively, the inner surfaces 60, 84, 88, and 92 may be gold plated such as to absorb incoming light.

Dimensional ratios based on comparative mentions of various aspects of the housing 49 are provided by laser beam dump 40. For example, a dimension 96 is established as the linear length of first sidewall 44 in cross section measured from the forward end 64 to the rear end 66. A second dimension 98 is the linear length in cross section of the second sidewall 46 measured from the forward end 70 to the rear end 72. A ratio of the dimension 96 of the first sidewall 44 to the dimension 98 of the second sidewall 46 may be in a range from about 3:1 to about 1:1. In one particular embodiment, the ration of dimension 96 to dimension 68 is 3:2. Thus, for example, if the dimension 96 is three inches, then dimension 98 is two inches.

With continued reference to FIG. 2, cone member 50 includes an apex 100 opposite a base 102. Cone member 50 may further include a conical shell 104 formed from a highly reflective surface. The conical shell 104 has a surface finish that is finer than the wavelength of the particular laser (which will be described in greater detail below) in order to get a high reflectivity to reflect the laser towards the inner surfaces of the walls forming the housing 49. When viewed in cross section, the conical outer surface 104 generally forms the shaped of an isosceles triangle. However, in actual configuration, the cone member 50 would be similar to that of a right angle cone. Cone member 50 includes an interior apex angle 106, a first base angle 108, and a second base angle 110. Inasmuch as the cross sectional alignment of conical shell 104 of cone member 50 is generally an isosceles triangle, the first base angle 108 and the second base angle 110 are equal. In one particular embodiment, the apex angle 106 is in a range from about 5° to about 25°. In another particular embodiment, the apex angle 106 is in a range from about 10° to about 20°. In another particular embodiment, the apex angle 106 is in a range from about 15° to about 18°. In another particular embodiment, the apex angle 106 is about 18°. When the apex angle 106 is 18°, the first base angle 108 and the second base angle 110 are about 81°. In other scenarios, the two base angles 108, 110 are equal to 180° less the apex angle 106 divided by two. For example, when the apex angle 106 is 12°, the first base angle 108 and the second base angle 110 are each 84°, and so on.

The apex 100 is aligned coaxially with the longitudinal axis 56 of housing 49. Moreover, the apex 100 and the longitudinal axis 56 are also aligned coaxially with an incoming laser beam (which will be described in greater detail below with respect to FIG. 3).

A dimension 112 is associated with the diameter of the base 102 of cone member 50. Further, a dimension 114 is associated with the diameter of the rear wall 42 measured diametrically through the center of rear wall 42 between the two radial outermost ends 62. A ratio of dimension 114 relative to dimension 112 is at least 2:1. In other particular scenarios, the ratio of dimension 114 relative to dimension 112 is about 3:1. Since the rear wall 42 and the apex 100 of cone member 50 are coaxially aligned with longitudinal axis 56 and the base 102 has a smaller dimension 112 than dimension 114, this causes portions of the inner surface 60 of rear wall 62 to be exposed inwardly towards chamber 94. Stated otherwise, base 102 of cone member 50 does not contact any longitudinally extending sidewall. Rather, base 102 of cone member 50 only contacts the rear wall which extends transversely relative to the longitudinal axis 56. This is in contradistinction to the conventional teachings of FIG. 1 wherein the base of a cone member directly contacts the longitudinally extending sidewalls at the location where the longitudinally extending sidewall meets a rear wall.

Moreover, the cone member 50 has been depicted as a generally solid member through cross sectional hatching in FIG. 2. However, it is to be understood that the interior components of cone member 50 do not necessarily require cone member 50 to be solid and it could include other electronic features or thermodynamic properties such as a cooling assembly.

Figure 3:
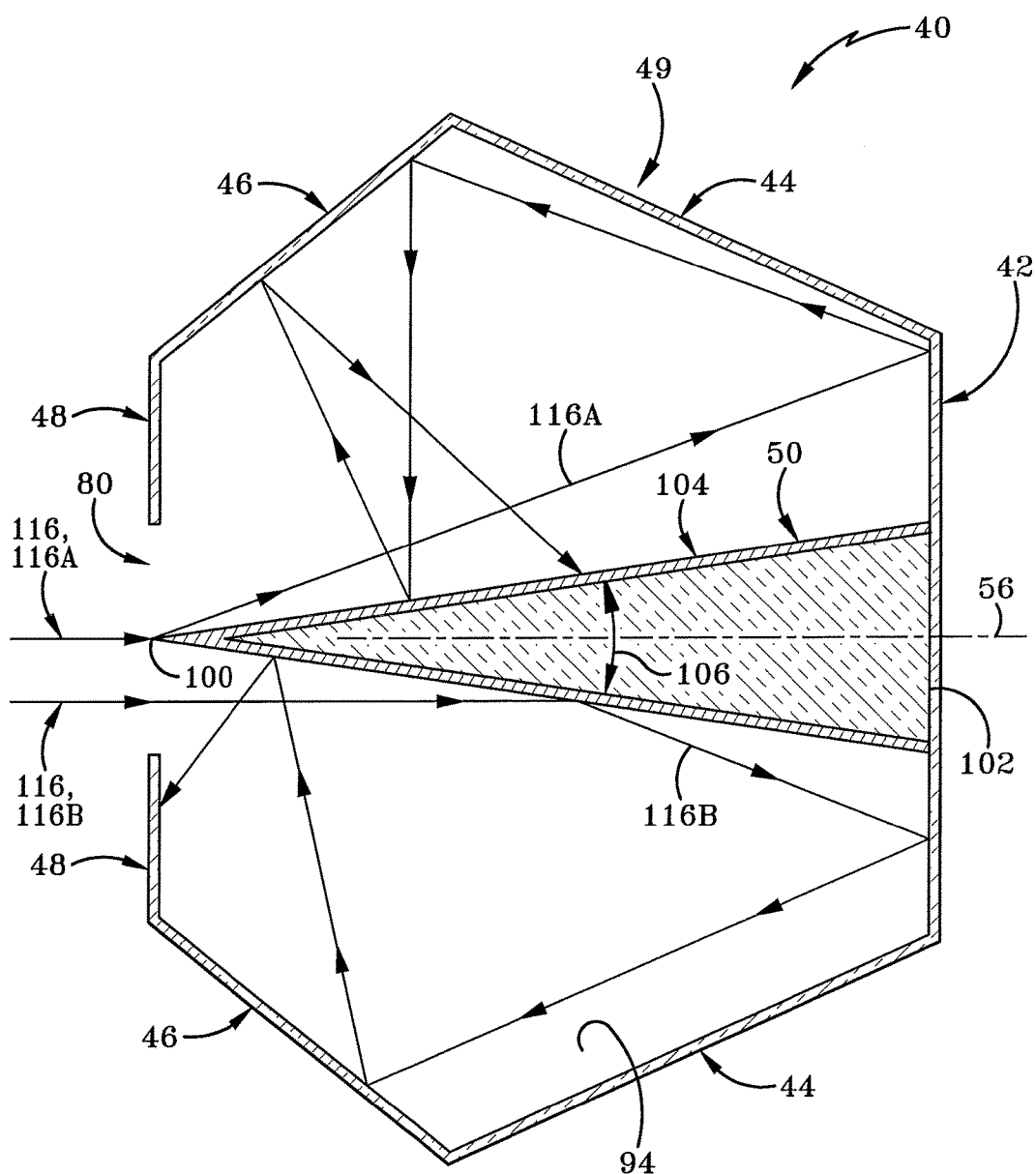
FIG. 3 is an operational cross section view of the laser beam dump in accordance with the present disclosure.

In operation, and as depicted in FIG. 3, an incoming laser beam 116 may be produced from a laser source as one having ordinary skill in the art would understand. The beam dump 40 enables the laser beam 116 to dissipate energy in a safe and controlled manner. As laser beam 116 passes through the opening 80, the laser beam 116 may contact a portion of the conical outer surface 104 of cone member 50. One laser beam 116A may contact the cone member 50 near apex 100 which will deflect and follow and the path of the arrows identified as 116A in FIG. 3. The high reflective nature of the conical outer surface 104 of cone member 50 functions to deflect laser beam 116 away from the cone member 50 towards the inner surface of housing 49. Recall, the conical surface is formed from a highly polished material the deflects and reflects substantially all of the laser towards the absorbing material defining the inner surfaces of the housing 49. The size of the apex angle 106 results in a very low scatter of laser 116A contacting cone member 50 near apex 110. The laser beam 116 continues to reflect at multiple angles within side chamber 94 to contact the absorbing material on the inner surfaces 60, 84, 88, and 92 in order to attenuate the laser beam 116A for subsequent bidirectional scatters. In this configuration, bidirectional scatter does not occur until after the laser beam 116A has deflected off of the highly reflective outer surface 104 of cone member 50.

With continued reference to FIG. 3, a second laser beam 116B may simultaneously enter the chamber 94 through entrance opening 80 simultaneous to first laser beam 116A. Second laser beam 116B deflects off of the cone surface to bounce around other regions of the interior chamber while its energy is being absorbed by contact with the absorbing materials forming the inner surface of the housing 49.

An embodiment is an implementation or example of the present disclosure. Reference in the specification to "an embodiment," "one embodiment," "some embodiments,"

"one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

What is claimed is:

1. A laser beam dump for reducing bidirectional scatter, the laser beam dump comprising:
   a housing defining a chamber, wherein the housing defines an entrance opening to the chamber;
   a rear wall of the housing opposite the entrance opening;
   a first sidewall of the housing extending towards the entrance opening from a non-orthogonal connection with the rear wall;
   a second sidewall of the housing connected non-orthogonally to a forward end of the first sidewall, and an obtuse angle defined between the first sidewall and the second sidewall in cross section;
   a ratio of first sidewall length to second sidewall length in a range from 1:1 to 3:1, wherein the ratio of first sidewall length to second sidewall length is 3:2; and
   a conical surface positioned in the chamber adapted to deflect a laser beam passing through the entrance opening.

2. The laser beam dump of claim 1, further comprising:
   a cone member including a apex and a base, wherein the apex is nearer the entrance opening and the base is nearer the rear wall;
   an interior angle of the apex in cross section in a range from 5° to 25°.

3. The laser beam dump of claim 2, wherein the range is from 10° to 20°.

4. The laser beam dump of claim 3, wherein the range is from 15° to 18°.

5. The laser beam dump of claim 2, further comprising:
   a first dimension associated with a diameter of the base of the cone member in cross section;
   a second dimension associated with a height of the rear wall in cross section;
   wherein the second dimension is greater than the first dimension.

6. The laser beam dump of claim 5, further comprising:
   a ratio of the second dimension to the first dimension of at least 2:1, and wherein a portion of the rear wall is exposed to the chamber.

7. The laser beam dump of claim 5, further comprising a ratio of the second dimension to the first dimension of about 3:1, and wherein a portion of the rear wall is exposed to the chamber.

8. The laser beam dump of claim 1, further comprising:
   an obtuse angle defined between the rear wall and the first sidewall in cross section.

9. The laser beam dump of claim 1, further comprising:
   a forward wall of the housing, wherein the forward wall defines the entrance opening, and the forward wall connected non-orthogonally to a forward end of the second sidewall.

10. The laser beam dump of claim 9, further comprising:
    an obtuse angle defined between the second sidewall and the forward wall in cross section.

11. The laser beam dump of claim 10, wherein the angle defined between the rear wall and the first sidewall is in a range from 100° to 120°.

12. The laser beam dump of claim 11, wherein the angle defined between the first sidewall and the second sidewall is in a range from 120° to 140°.

13. The laser beam dump of claim 12, wherein the angle defined between the second sidewall and the forward wall is in a range from 110° to 130°.

14. The laser beam dump of claim 13, wherein the angle defined between the rear wall and the first sidewall is 110°; wherein the angle defined between the first sidewall and the second sidewall is 130°; and wherein the angle defined between the second sidewall and the forward wall is 120°.

15. The laser beam dump of claim 14, wherein portions of the forward wall, the second sidewall, the first sidewall, and the rear wall that are exposed to the chamber are formed from a light absorbing material that absorbs at least 97% of contacting light.

16. A laser beam dump for reducing bidirectional scatter, the laser beam dump comprising:
    a housing defining a chamber, wherein the housing defines an entrance opening to the chamber;
    a rear wall of the housing opposite the entrance opening;
    a first sidewall of the housing extending towards the entrance opening from a non-orthogonal connection with the rear wall;
    a second sidewall of the housing connected non-orthogonally to a forward end of the first sidewall, and an obtuse angle defined between the first sidewall and the second sidewall in cross section;
    a ratio of first sidewall length to second sidewall length is 3:2;
    a cone member including an apex and a base, wherein the apex is nearer the entrance opening and the base is nearer the rear wall, the cone member defining a conical surface positioned in the chamber adapted to deflect a laser beam passing through the entrance opening;
    a first dimension associated with a diameter of the base of the cone member in cross section;
    a second dimension associated with the rear wall in cross section; and
    wherein the second dimension is greater than the first dimension such that a portion of the rear wall is exposed inwardly toward the chamber.

17. A laser beam dump for reducing bidirectional scatter, the laser beam dump comprising:
    a housing defining a chamber, wherein the housing defines an entrance opening to the chamber;
    a rear wall of the housing opposite the entrance opening;

a first sidewall of the housing extending towards the entrance opening from a non-orthogonal connection with the rear wall;

a second sidewall of the housing connected non-orthogonally to a forward end of the first sidewall, and an obtuse angle defined between the first sidewall and the second sidewall inside the chamber in cross section;

a ratio of first sidewall length to second sidewall length in a range from 1:1 to 3:1, wherein the ratio of first sidewall length to second sidewall length is 3:2;

a forward wall of the housing, wherein the forward wall defines the entrance opening, and the forward wall connected non-orthogonally to a forward end of the second sidewall; and a conical surface positioned in the chamber adapted to deflect a laser beam passing through the entrance opening.

18. A laser dump system for reducing bidirectional scatter, the laser beam dump system comprising:

a laser beam at a first wavelength generated from a source;

a housing defining a chamber, wherein the housing defines an entrance opening to the chamber for receiving the laser beam therethrough;

a rear wall of the housing opposite the entrance opening;

a first sidewall of the housing extending towards the entrance opening from a non-orthogonal connection with the rear wall;

a second sidewall of the housing extending towards the entrance opening from a non-orthogonal connection with the first sidewall;

a ratio of first sidewall length to second sidewall length is 3:2; and a conical surface positioned in the chamber having a reflective surface finish finer than the first wavelength to deflect the laser beam contacting the conical surface prior to contacting one of the first sidewall and the second sidewall to reduce bidirectional scatter.

* * * * *